MAGNETIC MEMORY DEVICE

Filed Aug. 9, 1954 2 Sheets-Sheet 1

RAYMOND STUART-WILLIAMS
MILTON ROSENBERG
INVENTORS

BY Lyon & Lyon
ATTORNEYS

Aug. 18, 1959 R. STUART-WILLIAMS ET AL 2,900,624

MAGNETIC MEMORY DEVICE

Filed Aug. 9, 1954 2 Sheets-Sheet 2

RAYMOND STUART-WILLIAMS
MILTON ROSENBERG
INVENTORS

BY Lyon & Lyon

ATTORNEYS

United States Patent Office 2,900,624

Patented Aug. 18, 1959

2,900,624

MAGNETIC MEMORY DEVICE

Raymond Stuart-Williams, Pacific Palisades, and Milton Rosenberg, Santa Monica, Calif., assignors, by mesne assignments, to Telemeter Magnetics, Inc., a corporation of California Application August 9, 1954, Serial No. 448,603

13 Claims. (Cl. 340—174)

This invention relates to magnetic storage devices for data and, more particularly, to an improvement in the construction of magnetic storage devices employing magnetic cores.

Magnetic-core matrix memories are known and have been described in articles by Jan A. Rajchman in the Proceedings of the IRE, October 1953 issue, page 1407, A Myriabit Magnetic-Core Matrix Memory, and in Static Magnetic Matrix Memory and Switching Circuits, RCA Review, vol. XIII, pages 183–201, June 1952, and in an article by J. W. Forrester entitled Digital Information Storage in Three Dimensions Using Magnetic Cores, Journal of Applied Physics, vol. 22, pages 44–48, January 1951.

The presently favored construction for a magnetic matrix memory employs a number of memory core planes. Each plane consists of a plurality of the toroidal cores in a two-dimensional array of columns and rows, a plurality of row coils each of which is inductively coupled to all the cores in a different row, and a plurality of column cores each of which is inductively coupled to all the cores in a different column. The column coils for each core plane are usually connected in series, so that the coils for the correspondingly located columns in each plane form a series of interconnected column coils. To drive a core in each plane, half the required excitation is applied to one of the series-connected column coils to which the desired core in each plane is inductively coupled. The remainder of the required excitation is applied to a row coil in each core plane, which row coil is also inductively coupled to the desired core. As thus far described, this has been the construction and operation of what can be termed a three-dimensional memory, i.e., one that uses a plurality of two-dimensional core planes. One of the difficulties attendant the operation of a memory such as this heretofore has been that drives to memory cores have been applied by coincident application of the driving currents to the selected row and column coils. This coincidence of drives at a core is not simple to effectuate in view of the propagation time involved when a current applied to one end of a column coil is required to reach one of the memory core planes at a distance from the point of current application. Still a further difficulty encountered is in preserving the wave shape of the driving currents applied to the series-connected column coils. Each of these, in view of the turns of the column coils, are in effect delay lines having variable delays which also render difficult the attempts to obtain coincident drives of row and column coils with proper wave shapes which permit effective operation of the memory. The earlier core memory construction did have column or row coils of the type in which the turns were separately wound around each core and then connected in series. To reduce the inductance presented as a result of such windings, instead of the turns being taken around each core individually, the turns in a coil would be passed through all the cores in a column at one side, the other side of the column coil being used to return or complete the loop.

This, however, does not completely resolve the difficulty. In essence, it may be stated that a magnetic-core memory has inductance, some of which works against the proper operation of the memory.

An object of this invention is to provide a memory construction in which a reduction in deleterious inductance effects is achieved.

Another object of the present invention is to provide a simplified construction for a magnetic-core memory wherein the inherent inductance is utilized to achieve a desired beneficial effect.

Yet another object of the present invention is to provide a simple, novel, and better performing magnetic memory.

These and other objects of the invention are achieved by utilizing a construction in the respective memory planes wherein the cores of each column are, in effect, folded over, so that the part of the cores which are folded over are positioned alongside of and adjacent to the remainder of the cores. In this manner, the folded-over column has cores on both sides of a column coil. Thus both coil sides of a column coil are utilized, and, for the same coil width, the core length and inductance are substantially reduced. Further, in interconnecting the column coils of a plurality of memory core planes, instead of a straight series-connection being made wherein the column coils are connected in sequence, the connections are made in a re-entrant manner, for example, the column coil in the first plane is connected to that of the third plane, which is connected to the fifth plane, which is connected to the fourth plane, which is connected back to the second plane. In this manner, the inductances which are in the series-connected column coils are evenly distributed, achieving further improvement in memory operation.

It is to be understood, of course, that the interconnected column coils are all correspondingly located in the respective ones of the memory core planes. Since the inductance of a coil is a direct function of its loop dimensions, reducing these dimensions reduces this inductance. Further, a considerable improvement in the operation of a memory is achieved by employing resistance wire for a row coil in place of the usual low resistance conductor plus a separate series resistor.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
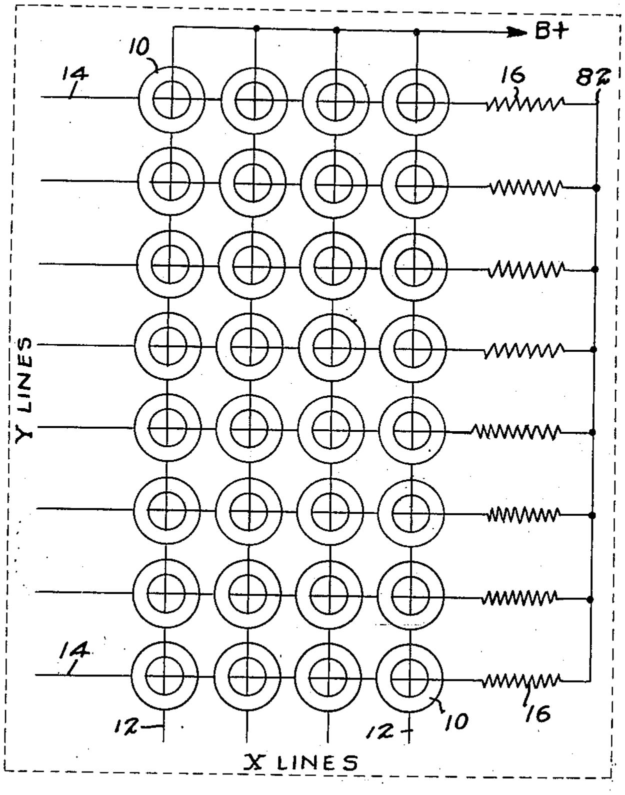
Figure 1 is a schematic drawing of the presently known memory core plane construction.

Referring now to Figure 1, the usual, presently employed type of core memory plane construction for a 4 x 8 array, by way of example, consists of a plurality of toroidal cores 10 preferably having substantially rectangular hysteresis characteristics. These cores are arrayed in columns and rows. A different column coil or X coil 12 is inductively coupled to all the cores in each column. A different row coil or Y coil 14 is inductively coupled to all the cores in each row. Each column coil and each row coil may consist of a single-turn coil, as illustrated, or a plural-turn coil which is connected at one end to a current driver (not shown). These drivers may be direct, vacuum-tube drivers or magnetic switches. The other ends of these column and row coils may be connected to a common lead and are respectively brought to a source of B+ if the drive is directly by vacuum tube or may be brought to ground if the drive is from a magnetic switch. If the core plane is to be used in a three-dimensional array, then the column coils of the plurality of core planes used are connected in series. In any event, it will be appreciated that the length and width dimensions of each of the respective coils, both column and row, is substantial. The reading coils have been omitted to simplify the drawings.

Figure 2:
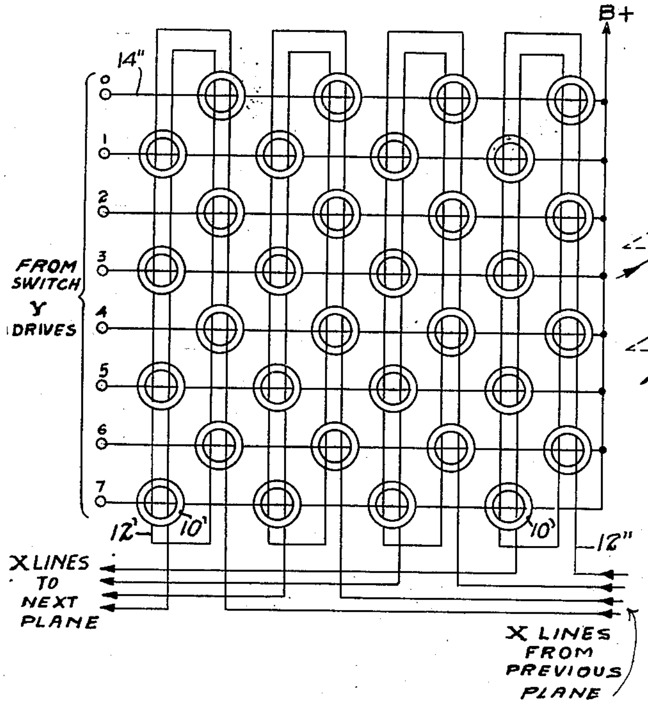
Figure 2 is a schematic drawing of an embodiment of the invention showing the use of folded columns in memory core construction.
Figure 2A:
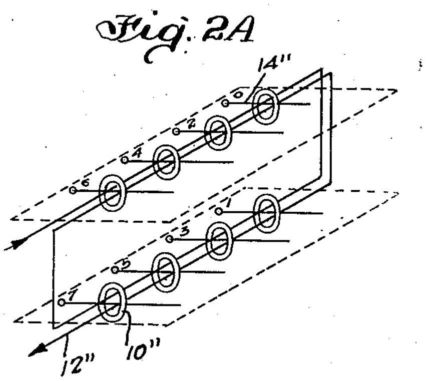
Figure 2A is a perspective drawing of another arrangement for the embodiment of the invention shown in Figure 2.

The drawing of Figure 1 shows single-turn coils. If a plurality of turns is required for each coil, the best practice heretofore has been to make a column coil, for example, as a single large coil with its winding turns on one side passing through all the cores, the return being made adjacent a core and through the matrix. The difficulty of constructing a memory in this manner, and further, the large inductance inherent in a coil construction of this type is materially reduced by employing a construction such as is shown in Figure 2 of the drawings which is employed in an embodiment of the invention. There is shown a schematic of a core plane in which the number of cores 10 comprising a column of cores is the same as is shown in Figure 1. However, instead of the cores being aligned in a single straight column, the column is folded over and substantially one-half of the cores are placed alongside the other half of the cores in the column. Thus a column coil 12' may be employed using the same number of turns as any of the column coils previously used, but the length of the coil is half that of the coil shown in Figure 1. Both sides of a coil are employed to link cores instead of only one side. Thus, the inductance of the column coil for the same number of turns and coil width is reduced. The effect of a saturated magnetic core on a coil to reduce its inductance is heightened by this arrangement. The arrangement shown in Figure 2 may be considered one wherein all the cores are in the same plane. Also within the scope of this invention is one wherein the cores on one coil side of the column coils are not in the same plane with the cores on the other coil side of the column coils. That is, the cores may be arranged in two parallel planes, if desired. This may be better visualized from Figure 2A, which is a perspective view of a single-folded column of cores wherein the cores 10'' on one side of the column coil 12'' are in one plane 11 shown by dotted lines and the cores on the other side of the column coil are in another plane 13 shown by dotted lines. The row coils are also in two parallel planes. The remaining folded columns of cores in a memory plane are placed alongside of the folded column shown in Figure 2A and are oriented in a similar manner. It is to be noted that an array of cores in this manner is designated as a memory core plane, as is also the case wherein all the cores are in a single plane as shown in Figures 1 or 2.

Figures 3, 4:
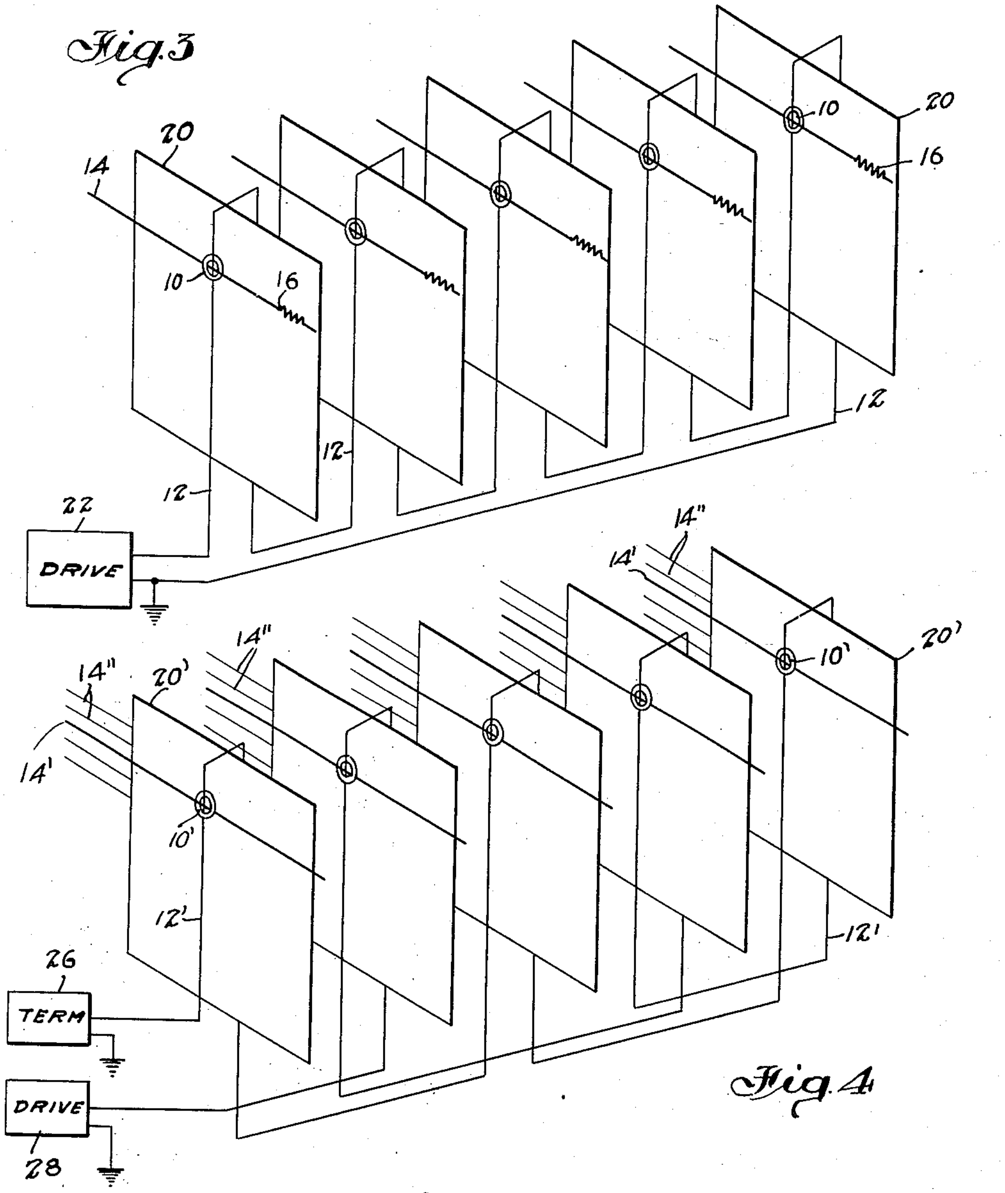
Figure 3 is a schematic diagram of presently known three-dimensional magnetic memory construction.
Figure 4 is a schematic diagram of an embodiment of the invention showing the re-entrant series interconnection of column coils.

Figure 3 is a schematic diagram of a three-dimensional memory. Each rectangular 20 represents a memory core plane consisting of an arrangement of the cores such as shown in Figure 1 or Figure 2. Of course, the number of cores employed would far exceed the 32 shown in Figure 1. When the respective core planes 20 are formed into a three-dimensional memory, correspondingly located column coils 12 are usually connected in series in the manner shown in Figure 3 schematically. Thus the interconnected column coils, in addition to their inherent inductance, have added thereto the inductance formed by their interconnection and the return loop to the driving source. It will be appreciated that there is shown schematically and for purposes of simplification only one of the column coils in each core plane connected in series with the correspondingly located column coil in the other core planes. There are as many of these series-connected column coils as there are columns. To drive a correspondingly located core 10 in each memory to a desired polarity of magnetization, current is applied from the drive source 22 to the series-connected column coils which are coupled to the desired core in each memory. Excitation of a proper polarity is also applied to a row coil 14 in each memory which is inductively coupled to the particular core desired to be turned over.

Figure 4 shows schematically an embodiment of the present invention for a three-dimensional memory array. Each one of the core planes 20' may be that shown in Figure 1 but preferably is like the one shown in Figure 2 or 2A. Here it will be seen that instead of the column coils 12' in the memory being connected in a straight series, they are re-entrantly connected in series. This can be expressed otherwise by stating that the correspondingly located column coils 12' in alternate ones of the memory planes are connected in series and then the two resulting series are connected together at one end and are driven from the other ends. This form of interconnection has the effect for each series-connected column coil of balancing the lumped inductances of the column coils and the distributed inductance of the interconnecting and return loop equally on both sides of the outgoing and incoming lines from the drive 22. The type of interconnection represented in Figure 3 has the effect of having the lumped inductances on the outgoing line and the distributed inductance on the return line, a very unbalanced arrangement.

Upon investigation, it was found that the series-interconnected column coils have the same characteristics as a low-pass transmission line wherein the lumped inductance of each one of the column coils is in series and the capacitance to ground of each one of the coils is in shunt. The inductance of the loop formed by the interconnections of the respective column coils, although distributed, may be considered as added to the inductance of each one of the coils. With the type of interconnections employed in Figure 3, an unbalanced transmission line is formed which adversely affects any wave shape when a current is propagated down the line.

Figure 5:
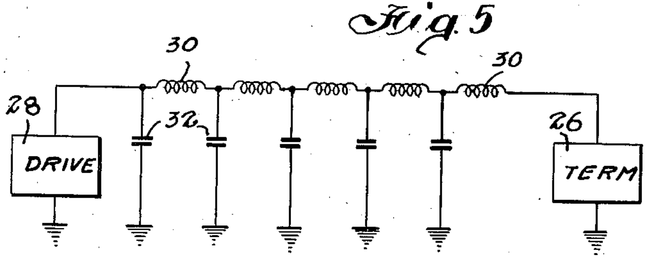
Figure 5 is a circuit diagram representative of the transmission line which is formed by the interconnection of the plurality of memory core planes which provides a three-dimensional memory array.

Figure 5 represents schematically the type of balanced transmission line which is formed by using the arrangement shown in Figure 4. The inductances 30 represented as a lumped inductance in the diagram corresponds to the inductance of each one of the column coils plus that amount of the distributed inductance attributed to the loop formed by the interconnections. The lumped capacitance 32 is representative of the distributive capacitance of each coil to ground. As a result of the novel folded-over column and the re-entrant series-connection construction shown in Figure 4, the coil dimensions, and hence the inductance of the transmission lines, is reduced, although the same number of ampere turns drives each core. Furthermore, with the appreciation of the fact that in a three-dimensional memory, in effect, each of its series-connected column coils is a transmission line, by properly disposing along the line the inductances necessarily present by virtue of the requirements of the memory and by properly terminating that transmission line with a characteristic terminating impedance 26 and by properly driving the transmission line from a source impedance 28, the line becomes resistive instead of inductive and the wave shape of the propagated current is not substantially altered. Thus, by properly constructing driving and properly terminating the transmission line formed by each series of interconnected column coils, delay effects are minimized or brought down to tolerable limits and, further, the driving current wave shape is not substantially altered.

A further beneficial utilization of the inductance present in a three-dimensional memory embodying the present invention can be appreciated from the following explanation. Assume that a drive is applied to the series of column coils and to the respective row coils in each of the core lpanes, so that a number of cores in the three-dimensional memory are turned over simultaneously. There will be a voltage induced in the respective column coils when each core is turned over. As a result of this voltage, a current flows in the column coil in a direction which tends to oppose the action of turnover. These currents from cores already turned over propagate in both directions. If there is no delay in the series-interconnected column coils, these currents can add to provide a total current of $$\frac{NI}{2}$$

which appears at the cores at each end of the series-connected column coils. "N" is the number of cores turned over and "I" is the current due to each core. Thus, if it takes longer for certain of the cores to turn over than others, the current from the cores which have already been turned over can be sufficiently large to prevent turnover of these slower acting cores. If delays are inserted in the series-connected column coils, the end currents are made smaller because the delays serve to prevent addition in phase of the currents. It is thus possible, by varying the inductance of each one of the column coils in a series, to make the delays such that a substantial cancellation occurs as a result of currents being generated which are not added in phase. Since the inductance of any coil is determined by its length and width, the inductance of a memory construction, which includes memory core planes having folded-over columns, may be varied by varying the spacing between the two halves of the folded-over columns. The delays can thus be made such that current addition in phase is minimized.

Referring again to Figures 1 and 3, which show the prior-art practice, it has been customary heretofore to employ a resistor 16 in series with each row coil. The value of the resistor 16 is usually low, being on the order of two ohms. The reason for the employment of this resistor is because, when a magnetic switch drive is employed in the manner described in the previously mentioned RCA Review article by Rajchman, in order to maintain the wave shapes coming out of a switch core fairly identical, it is important that the load presented to that switch be maintained fairly constant. Whether or not a selected core which is attempted to be driven from a switch core turns over responsive to the core drive makes a difference in the load seen by that switch. If the core turns over, the load is a large one. If the core does not turn over, the load is small. Using a series impedance minimizes these load variations. Such an impedance can be inductive or resistive, but it will be appreciated from the above that an inductance is not a desirable type of impedance in this instance and, further, current can be more readily driven through a resistance than through an equivalent inductance impedance.

A further utilization for a resistance in series with a row coil is to provide dissipation for current induced in a row coil when a core turns over. Thus, the induced current cannot act to buck the driving current. A resistance has been inserted in series with the row coils in memories previously used. It is well known that a lumped resistance, when high frequencies are used, actually presents an impedance which can be represented as a series inductance and resistance shunted by a parallel capacitance. The drive applied to a row coil is a substantially rectangular wave shape which has a duration on the order of microseconds and a rise time on the order of tenths of a microsecond. Accordingly, the series resistor employed in the memories heretofore have contributed substantially to distortion of the wave shapes applied to the row coils.

In the present invention, instead of constructing the memory with a series resistor 16 in each row coil, the row coil 14' in each instance is constructed of a resistance wire having sufficient resistance to provide the same desirable effect as the lumped resistance employed heretofore, but in view of the fact that this resistance is distributed over the length of the coil, its impedance is substantially purely resistive and not capacitive or inductive. This effectively produces a considerable improvement in the wave shape of the driving current applied to the row coil. This construction can be seen in Figures 2 and 4 of the drawings where the resistor is omitted and the row coils 14' in each instance are made using Nichrome wire. When a desired length of Nichrome wire has been provided which adds the required resistance, the remainder of the wire can be copper plated and connections made to the copper-plated end portions in the same manner as is performed with the usually employed copper wire.

One further feature of the present memory core construction is shown in Figure 4. This consists of employing extra rows of cores and row coils 14'' in each memory core plane. In the usual construction of cores, unless extremely great care is taken, in view of the fragile nature of the cores employed, it will happen that after a memory is completed one or more of the cores is either cracked or has disintegrated. In the normal course of events, either the memory plane is substantially useless or complex programming must be employed to avoid attempted storage in the damaged or missing cores. This situation is avoided with the construction shown in Figure 4 in the provision of spare rows of cores which can be connected in and employed in place of the rows having the missing or damaged cores. Thus the memory plane can still be used an no difficult programming is required. Thus in Figure 2, for example, rows 0 and 1 may be spares.

Although the number of cores employed in a core plane and the number of planes shown in the drawings are few in number, this is not to be considered as a limitation on the invention. The principles described herein may be employed with core memories of any desired size.

Accordingly, there has been described and shown herein a novel and useful construction for a magnetic memory array wherein the induction effects which are deleterious in the operation of the memory are substantially minimized.

We claim:

1. A magnetic memory core array consisting of a plurality of memory core planes, each core plane including a plurality of magnetic memory cores each of which is capable of assuming two stable remanence conditions, said cores in each core plane being arranged in columns and rows, each column being folded over with approximately one-half of the cores in a column being aligned and spaced alongside of the other half of the cores in the column, each core plane having a plurality of row coils, each of which is inductively coupled to all the cores in a different row, each of said row coils including resistance wire to provide a desired resistance in said coil, a plurality of column coils, each of which is inductively coupled to all the cores in a column, means to couple in series correspondingly located column coils in alternate ones of said core planes to form two series-connected column coils for each of said correspondingly located columns in all said core planes, and means to couple each one of said two series-connected column coils together at one end to provide a single re-entrant series-connected column coil for each of said correspondingly located columns in all said core planes, a plurality of terminating impedances a different one of which is connected to one end of a different one of said re-entrant coils, and means to selectively apply excitation to a desired one of said re-entrant coils at its other end.

2. A magnetic memory as recited in claim 1 wherein the value of each of said terminating impedances is equal to the characteristic impedance of each of said re-entrant coils.

3. A magnetic memory core array consisting of a plurality of memory core planes, each core plane including a plurality of magnetic memory cores each of which is capable of assuming two stable remanence conditions, said cores in each core plane being arranged in columns and rows, each column being folded over with approximately one-half of the cores being aligned alongside of the other half of the cores, each core plane having a plurality of row coils each of which is inductively coupled to all the cores in a different row, a plurality of column coils each of which is inductively coupled to all the cores in a different column, means to couple in series correspondingly located column coils in alternate ones of said core planes to form two series-connected column coils for each of said correspondingly located columns in all of said core planes, means to couple each one of said two series-coupled column coils together at one end to provide a single re-entrant series-connected column coil for each of said correspondingly located columns in all said core planes, impedance means to terminate one end of each of said re-entrant series-connected coils, and means to selectively excite the other end of a desired one of said re-entrant series-connected coils.

4. A magnetic memory core array consisting of a plurality of memory core planes, each core plane including a plurality of magnetic memory cores each of which is capable of assuming two stable remanence conditions, said cores in each core plane being arranged in columns and rows, each column being folded over with approximately one-half of the cores being aligned alongside of the other half of the cores, each core plane having a plurality of row coils each of which is inductively coupled to all the cores in a different row, a plurality of column coils each of which is inductively coupled to all the cores in a different column, means to couple in series correspondingly located column coils in alternate ones of said core planes to form two series-connected column coils for each of said correspondingly located columns in all of said core planes, and means to couple each one of said two series-coupled column coils together at one end to provide a single re-entrant series-connected column coil for each of said correspondingly located columns in all said core planes.

5. A magnetic memory core array consisting of a plurality of memory core planes, each core plane including a plurality of magnetic memory cores each of which is capable of assuming two stable remanence conditions, said cores in each core plane being arranged in columns and rows, each core plane having a plurality of row coils each of which is inductively coupled to all the cores in a different row, a plurality of column coils each of which is inductively coupled to all the cores in a different column, means to couple in series correspondingly located column coils in alternate ones of said core planes to form two series-connected column coils for each of said correspondingly located columns in all of said core planes, means to couple each one of said two series-coupled column coils together at one end to provide a single re-entrant series-connected column coil for each of said correspondingly located columns in all said core planes, impedance means to terminate one end of each of said re-entrant series-connected coils, and means to selectively excite the other end of a desired one of said re-entrant series-connected coils.

6. A magnetic memory core array consisting of a plurality of memory core planes, each core plane including a plurality of magnetic memory cores each of which is capable of assuming two stable remanence conditions, said cores in each core plane being arranged in columns and rows, each core plane having a plurality of row coils each of which is inductively coupled to all the cores in a different row, a plurality of column coils each of which is inductively coupled to all the cores in a different column, means to couple in series correspondingly located column coils in alternate ones of said core planes to form two series-connected column coils for each of said correspondingly located columns in all of said core planes, and means to couple each one of said two series-coupled column coils together at one end to provide a single re-entrant series-connected column coil for each of said correspondingly located columns in all said core planes.

7. A magnetic memory core array consisting of a plurality of memory core planes, each core plane including a plurality of magnetic memory cores each of which is capable of assuming two stable remanence conditions, said cores in each core plane being arranged in columns and rows, each column being folded over with approximately one-half of the cores in the column being aligned and spaced alongside of the other half of the cores in the column, each core plane having a plurality of row coils each of which is inductively coupled to all the cores in a different row, a plurality of column coils each of which is inductively coupled to all the cores in a different column, means interconnecting the column coils of each of the correspondingly located columns in said memory core array in series and in a re-entrant fashion to form said series-connected column coils into a substantially balanced transmission line, means to terminate one end of each of said transmission lines in its characteristic impedance, means to selectively apply current to a desired one of said transmission lines at its other end, and means to selectively apply current to a desired one of said row coils in said memory core planes to effectuate turnover of desired ones of said cores.

8. A magnetic memory core array as recited in claim 7 wherein each of said transmission lines is of the type including series inductances and parallel capacitances, each of said series inductances including a column coil, the value of each said inductance being determined by the number of turns in said column coil and the spacing between the halves of the folded-over columns.

9. A magnetic memory core array consisting of a plurality of memory core planes, each core plane including a plurality of magnetic memory cores each of which is capable of assuming two stable remanence conditions, said cores in each core plane being arranged in columns and rows, each column being folded over with approximately one-half of the cores in a column being aligned and spaced alongside of the other half of the cores in the column, a plurality of column coils, each of which is inductively coupled to all the cores in a different column, a plurality of row coils each of which is inductively coupled to all the cores in a different row, means interconnecting in series the column coils of each of the correspondingly located columns in said memory core array, and means to apply excitation to a selected one of said series-connected column coils and to selected ones of said row coils whereby driven ones of said cores induce voltages in said selected series-connected column coils, the spacing between the cores in each of the halves of the folded-over columns being adjustable to provide the proper delays in each of said series-connected column coils to minimize the effects of said induced voltages.

10. A magnetic core memory plane consisting of a plurality of memory cores each of which is capable of assuming two stable remanence conditions, the cores in said memory plane being arranged in columns and rows, each column being folded over with approximately one-half of the cores in a column being aligned and spaced on one side of the other half of the cores in the column, a plurality of column coils, each of which is inductively coupled to all the cores in a different column, and a plurality of row coils each of which is inductively coupled to all the cores in a different row.

11. A magnetic core memory plane as recited in claim 10 wherein said one-half of the cores in all said columns are in one plane, and said other half of the cores in all said columns are not in the same plane.

12. A magnetic core memory plane as recited in claim 10 wherein each of said row coils includes resistance wire to provide a desired value of resistance for each of said coils.

13. A magnetic core memory including a plurality of core planes, each core plane consisting of a plurality of magnetic cores each of which is capable of assuming two stable remanence conditions, said cores in each core plane being arranged in columns and rows, a plurality of row coils each of which is inductively coupled to a different row of cores, a plurality of column coils each of which is inductively coupled to a different column of cores, means interconnecting each of the column coils which are correspondingly located in each core plane in series to provide a plurality of series-connected column coils, means to selectively drive one of said series-connected column coils, and means to terminate said driven series-connected column coil in its characteristic impedance.

References Cited in the file of this patent

UNITED STATES PATENTS

| | | |
|---|---|---|
| 2,060,644 | Stiebel | Nov. 10, 1936 |
| 2,130,715 | Coupier | Sept. 20, 1938 |
| 2,135,609 | Van Tassel | Nov. 8, 1938 |
| 2,784,391 | Rajchman | Mar. 5, 1957 |

OTHER REFERENCES

Publication I, "Ferrites Speed Digital Computers," by Brown and Albers-Shoenberg, Electronics Magazine, April 1953 (pages 146–149).

Publication II, "A Myriabit Magnetic-Core Matrix Memory" by Rajchman, Proceedings of the IRE, October 1953 (pages 1407–1410 and 1416–1417).

Publication III, "The Single Core Magnetic Amplifier as a Computer Element" (Ramey), A.I.E.E. Transactions, part I, Communications and Electronics, pp. 442–446, January 1953 (Figs. 4 and 5 relied on page 444).